(No Model.)　　　　　　　　　　　　　　　2 Sheets—Sheet 1.
S. CUNNINGHAM.
HORSESHOEING MACHINE.

No. 541,920.　　　　　　　　　Patented July 2, 1895.

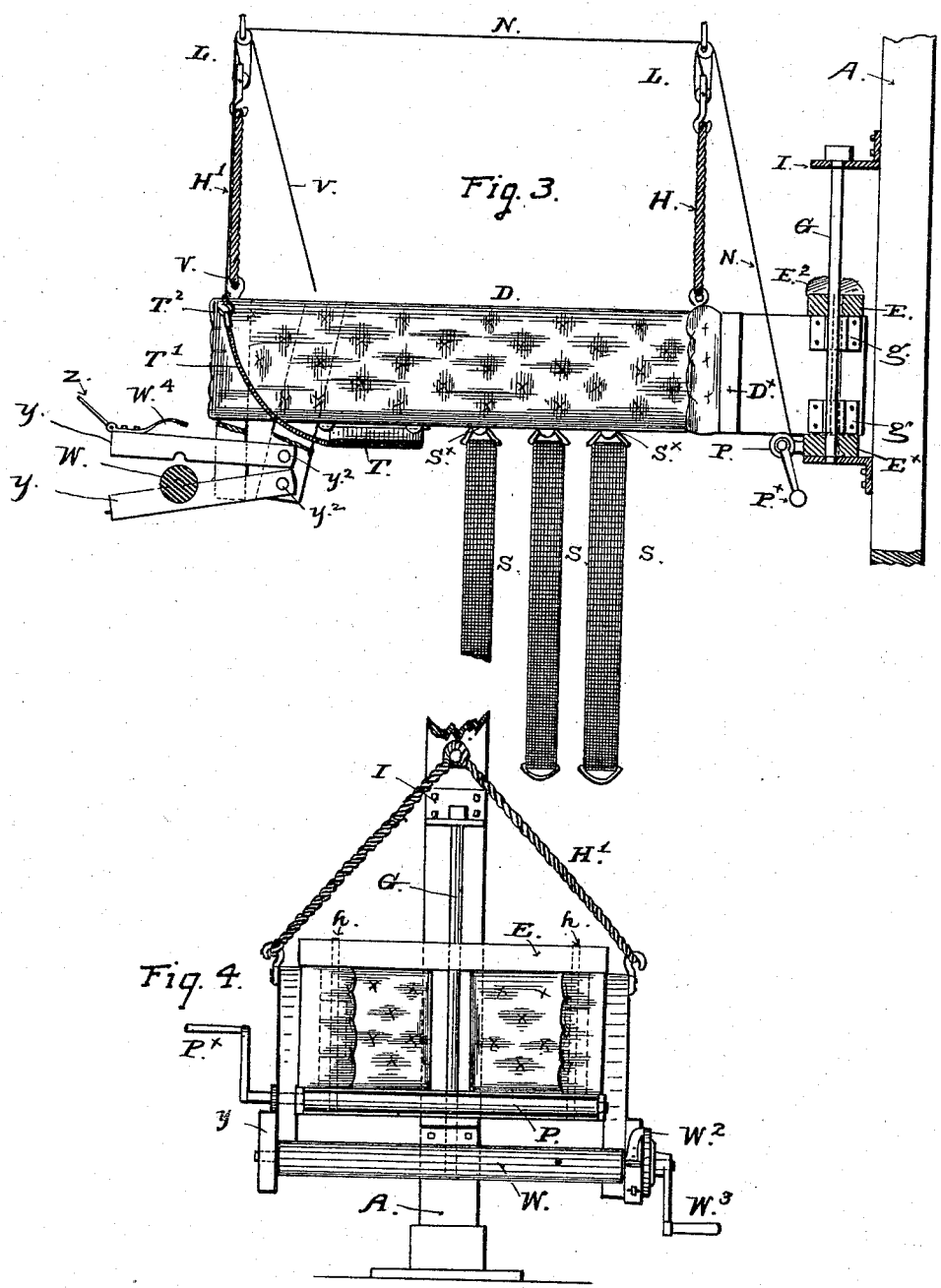

E

UNITED STATES PATENT OFFICE.

SAMUEL CUNNINGHAM, OF SACRAMENTO, CALIFORNIA, ASSIGNOR OF ONE-HALF TO GEORGE H. HARTER, OF SAME PLACE.

HORSESHOEING-MACHINE.

SPECIFICATION forming part of Letters Patent No. 541,920, dated July 2, 1895.

Application filed April 19, 1894. Serial No. 508,181. (No model.)

*To all whom it may concern:*

Be it known that I, SAMUEL CUNNINGHAM, a citizen of the United States, residing in the city and county of Sacramento, in the State of California, have invented certain new and useful Improvements in Horseshoeing-Machines, of which the following is a specification.

My invention relates to apparatus for confining refractory horses and other animals while they are being shod, sometimes called shoeing-brakes and shoeing-stalls; and the invention has for its object, mainly, the production of a machine or apparatus within which a wild or refractory animal can be placed and secured without difficulty and loss of time, and in which it can be held in the most favorable position without injury either to the animal or to the person operating on the same.

The invention consists, principally, in a certain construction and combination of stall composed of hinged sides capable of being opened to admit an animal and of being closed around the animal to form a close box or stall, together with bands, ropes or straps and other means adapted and applied to suspend the animal as well as to control its movements in the stall; and in connection therewith, hoisting-ropes and tackle for elevating and holding the stall at proper elevation from the ground to raise the animal off its feet, all as hereinafter more particularly set forth.

The following description explains the nature of the said improvements and the manner in which I proceed to construct my machine or apparatus in accordance therewith, reference being had to the accompanying drawings that form part of this specification.

Figure 1:
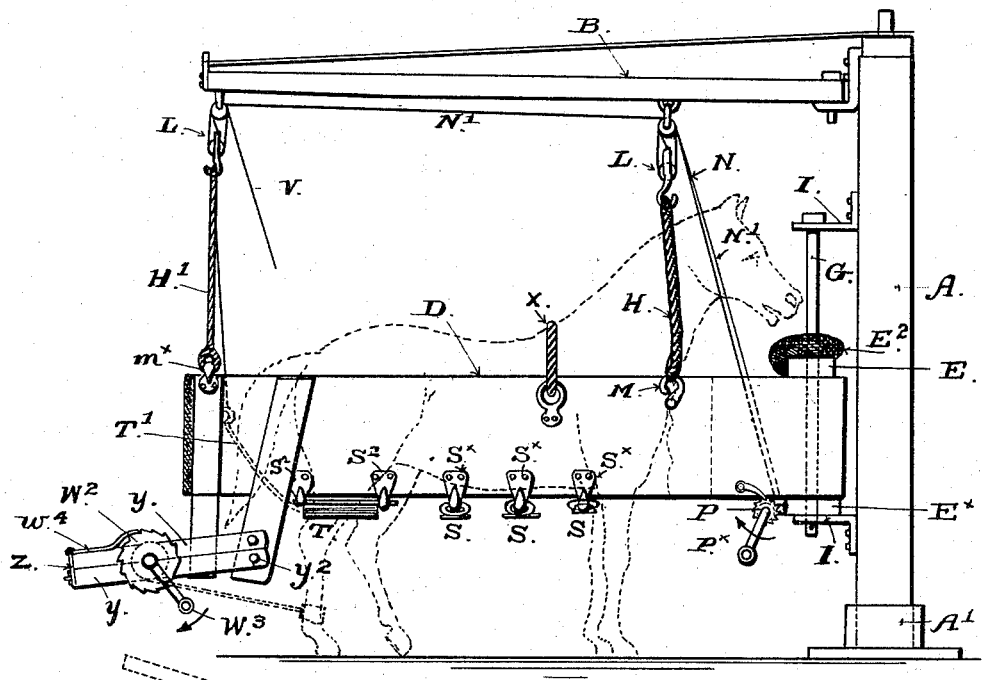
Figure 2:
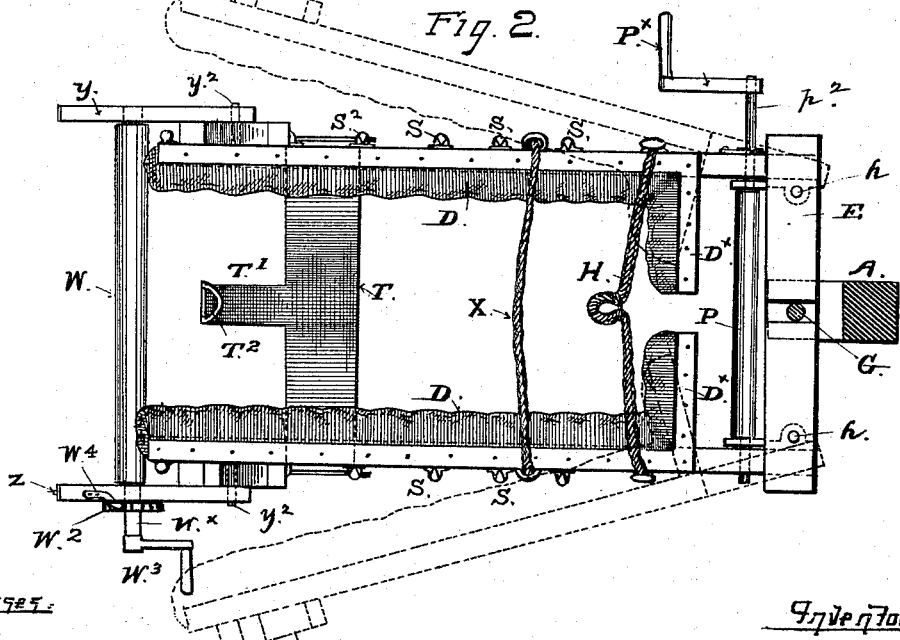

In the said drawings, Figure 1 is a side elevation of a machine or apparatus containing all the features of my invention. Fig. 2 is a plan or top-view of the stall. The two positions of the hinged sides when closed and when open are represented in the one case by full lines and in the other case by dotted lines. Fig. 3 is a side-view partly in longitudinal section with one hinged section of the stall removed. Fig. 4 is an end elevation taken from the rear.

The principal parts of this machine or apparatus comprise a stationary post or pillar, forming a fixed support, a box or stall composed of two side-boards attached at the front ends to the post by hinges, on which they open outwardly to take in the animal and close together along the sides of the animal, and means for securing and supporting the animal when closed in and confined by the frame, and means for hoisting the frame to lift the animal off his feet and for carrying and sustaining the frame and the weight of the confined animal. In connection with this suspending-mechanism, the machine or apparatus is provided with novel means for elevating the rear feet of the animal without taking him off his fore feet, and also with novel means for confining either one of the hind feet and holding it in position for shoeing.

In constructing the apparatus according to the accompanying drawings, the post —A— is fixed in upright position either permanently by sinking it in the ground, or by securing its base in a socket and foot-plate —A'— bolted to the floor.

To the top of this post is attached a boom —B— in position extending horizontally out from the post, and beneath the boom is placed the frame composed of the movable sides —D— —D, each so attached to the post by a hinge-joint that they can be thrown open and spread apart at the rear end to let an animal be brought into position and after they are closed and the animal is secured they can be hoisted while they remain attached to and held by the post.

On each side-board —D— near the front end is a fixed head-board —D$^x$— at right angle and extending from the side —D— inward, so that these two end-pieces close in the head or front of the space between the sides —D—D— when they are closed together upon the animal. The inner surfaces of these side-pieces and end-pieces are padded as shown in Figs. 2 and 3 to prevent the animal from injuring himself.

The side pieces —D— are attached by straps —g— —g— near the front ends to upright rods —h—h— secured at top and bottom in horizontal cross-bars —E—E— setting across the front end of the frame, and between these bars and on the rods —h— as pivots the front ends of the side-pieces are movable. On these centers —h— they can be thrown outwardly in a horizontal arc to stand, if required, at an angle of ninety degrees to the position they occupy when closed. In Fig. 3 the dotted lines indicate their position when the frame is partly open, but from that point they can be thrown outward to a greater extent, so that a timid or fractious animal can be led into position close to the post without being alarmed and the frame can be quietly and quickly closed around him, where, otherwise, it would be difficult to lead the animal into the open rear end of the frame. The top and bottom cross-bars —E—$E^x$— are attached to the post by the rod —G, which is fixed at top and bottom in brackets —I—I— secured to the front face of the post. This rod passes through the two bars —E—$E^x$, and they are fitted to slide up and down on it. The top bar —E— should be padded as shown at —$E^2$— Fig. 1, to protect the animal from the hard surfaces and sharp corners. To the side-pieces of this frame near the front, and also at the rear, is fastened a sling by which a set of hoisting-tackle is attached to hoist the frame. The front sling —H— is fastened to the side-pieces —D— by hooks —M— secured on the outside near the top, and eyes or rings on the ends of the rings, and the rear sling —H'— is fastened in the same manner by hooks —$m^x$— on the rear ends of the pieces —D.

A set of blocks —L—L— with double sheaves is fastened to the boom —B— overhead directly over each sling, and the lower one of the blocks in each carrier has a hook to take the loop of the eye on the middle of the sling.

The hoisting ropes —M—$m^x$— from these two sets of blocks run forward through the sheaves of the top blocks and down to a windlass —P— on the front of the frame, to which they are made fast. Bearings for the roller of this windlass are fastened on the lower one —$E^x$— of the cross-bars and a crank —$P^x$— is fixed on the outer end of one journal —$p^2$— of the roller, for working it. The rope —N— of the first tackle is fastened to the lower block of the front set and is carried up around one sheave of the top-block and thence down around the bottom sheave and up again on the other sheave in the top-block, in which there are two; and from this top-block the rope is brought down to the windlass —P. The rope —N'— from the rear tackle is carried in the same manner through and around the sheaves of its blocks and thence forward through the top-block of the front tackle and down to the same windlass; so that both ends of the frame are hoisted at the same time and a horizontal or level position is maintained.

On the outside of the side-pieces of the frame —D—D— are secured strong hooks or rings —$S^x$— —$S^x$—, those on one side in line with those in the opposite side, and by these fastenings strong bands or strips —S—S— are fastened to the frame underneath and across the space inclosed between the sides of the frame. These bands when passed under the body of the animal and secured to the frame by the fastenings before mentioned support the weight of the animal if the frame be hoisted. Usually I provide three of these bands under the central portion of the frame; but this number may be increased or reduced as circumstances may require. In addition to these bands, provision is made for securing a band —T— in the same manner under the frame, but in position just in front of the hind legs of the animal and to the middle of this band is secured a strap —T'— provided on the end with eyes or loops —$T^2$. This band is used principally for elevating the hind end of the animal to bring his legs off the ground, and it is attached to the frame by the hooks —$S^2$— on the sides of the frame, so that it can be removed when not required. It is operated by making the end —$T^2$— fast to the end of a hoisting rope —V— and passing it over a sheave in the top-block. When the strap —T'— is drawn up the rope —V— is made fast to one of the hooks on the frame, or to a hook or cleat provided on the rear of the frame. Across this end of the frame a roller —W— is mounted in bearings of such character that while holding the roller in horizontal position outside and across the frame, they can be opened to remove the roller or to so disconnect it that the sides of the frame can be thrown open on their hinges.

In the present construction I form bearings for the roller journals —$w^x$— in and between two strips or bars —y—$y^x$, which are pivoted by the inner ends to the sides of the frame —D, one upon the other, on which points —$y^2$— they are capable of being opened by separating them at the outer ends; so that the roller can be unshipped by opening the two bars, or set and held in position by closing the two bars together over the journals. This construction of bearing is the same for both ends of the roller. The outer ends of the two bars in each pair are fastened together by a hasp and staple —Z— or by any other suitable character of lock. One journal of the roller extends beyond the bearing at one side of the frame and takes a ratchet-wheel —$W^2$— and also a hand-crank —$W^3$. A pawl —$W^4$— is fixed on top of the bar —Y— to engage the teeth of the ratchet-wheels. With this roller at the rear end of the frame the hind feet of the animal are drawn back and securely held in position to be shod, first one foot, and afterward the other, by fastening around the ankle a strap or a boot and then connecting to the boot a strap or cord having its end made fast to the roller. When this is done the roller is turned by the crank and as the strap is wound up on the roller it draws the leg back to the rear of the frame where it can be readily turned up into position for shoeing.

Provision is made for fastening top bands, straps or ropes across the frame over the back of the animal, such as illustrated at —X— in Figs. 1 and 2, in cases where an animal requires to be closely secured and confined.

These parts and mechanism above described constitute the principal feature of my improved apparatus. The mode of handling and working it will be obvious to those persons familiar with the work of shoeing and working on wild, refractory or vicious animals. The apparatus will be found useful also for veterinary purposes and operation.

Having thus fully described my invention, what I claim therein as new, and desire to secure by Letters Patent, is—

1. The herein described apparatus to confine animals for shoeing and performing other operations comprising a stationary upright support, a frame composed of hinged sides movable vertically on said support to which they are hinged at one end to open outwardly at the opposite end of the frame, girths attached to the said sides beneath the animal and means for hoisting the said frame to raise the animal off its feet and for supporting the weight of the frame and the confined animal, substantially as hereinbefore set forth.

2. In an apparatus for confining and handling animals, the combination substantially as hereinbefore set forth with a fixed support, of the side-pieces hinged to said support at one end, and capable of vertical movement at said point of attachment, and of opening outwardly at the opposite end to let in the animal, the girths attached to the side-girths and extending under the body of the animal, the overhead tackle attached to said side-pieces for receiving and supporting the same and the confined animal clear of the ground and the windlass at the front for operating said tackle.

3. In a frame for confining and handling animals, the combination substantially as hereinbefore set forth, of the fixed upright support, the hinged side-pieces attached to said support and capable of vertical movement thereon, and of opening apart at the outer ends to let in the animal, the overhead tackle L L N N' and windlass P for hoisting and supporting said side-pieces when closed upon the animal, the girths S S for supporting the animal, and the band T and the connection T' and cord V as a means for elevating the rear end of the animal, and the windlass W W² W³ at the rear end of the frame for controlling the hind legs of the confined animal.

In testimony that I claim the foregoing I have hereunto set my hand and seal.

SAMUEL CUNNINGHAM. [L. S.]

Witnesses:
C. E. THOMAS,
CHAS. AUSTIN.